April 12, 1932.  D. M. SOLENBERGER  1,853,937

PISTON RING

Filed Oct. 31, 1930

Inventor:
Dean M. Solenberger,
By Whittemore Hulbert Whittemore & Belknap
Attys.

Patented Apr. 12, 1932

1,853,937

UNITED STATES PATENT OFFICE

DEAN M. SOLENBERGER, OF CLEVELAND, OHIO, ASSIGNOR TO THE SIMPLEX PISTON RING COMPANY OF AMERICA, INC., A CORPORATION OF OHIO

PISTON RING

Application filed October 31, 1930. Serial No. 492,549.

The invention relates to piston rings and more particularly to rings designed for replacement in pistons of various constructions and which have been subjected to different degrees of wear. It is the object of the invention to obtain a construction which may be used either as a compression ring or an oil ring which can be easily engaged with piston grooves and without danger of breakage.

In the present state of the art there is no standard depth for the ring grooves of pistons used in internal combustion engines, these frequently varying from one-eighth to three-sixteenths in radial depth where the width or axial dimension is the same. It is also customary to decrease the diameter of the piston below the lowermost groove so as to give an increased clearance between the same and the cylinder wall. Where, as is frequently the case, the cylinder is warped, distorted or worn so as not to be of true circular form, an ordinary piston ring will not conform thereto to make a tight seal. However, a ring which is restricted in radial depth to be more flexible and which is backed by an expander having contacts distributed around the circumference thereof may be held in close contact with the cylinder wall. Rings of this type have heretofore been used as replacement rings but difficulty has been experienced in the mounting of the rings on the piston and the engagement of the same with the cylinders. This is due to the fact that with shallow ring grooves the tension of the expander when engaged therewith may expand the inner face of the ring beyond the circumference of the piston. There is therefore danger that in entering the rings in the cylinder they may overlap and catch on one edge of the ring groove so as to be broken. Particularly where one land of the ring groove has been relieved as at the bottom of the piston, there is danger of this result.

With my improved construction I avoid the difficulties above referred to and at the same time obtain a high efficiency both in sealing for pressure and in preventing oil pumping.

My improved ring consists essentially in a construction which is restricted in radial depth to give the desired flexibility and also to adapt it for use in ring grooves of minimum radial depth. The necessary radial tension is supplied by an expander preferably formed of a corrugated ribbon of steel having contact points distributed around the circumference to conform the flexible ring to the cylinder wall. To insure registration of the ring with the ring grooves even where the latter are quite shallow, the upper edge of the ring or side towards the combustion chamber is provided with a radially inwardly extending lip or flange of sufficient depth to be certain to enter the groove. The expander is less in width than the ring groove by an amount approximately the same as the thickness of this lip or flange, one edge of said expander engaging the inner face of the lip and the other edge engaging the opposite face of the groove. Thus even where the groove is so shallow that the thin portion of the ring will not enter the same before the contraction of the ring, and where the piston has been greatly relieved or reduced in diameter adjacent to the groove on the side opposite to that engaged by the lip, the expander will hold said ring in registration with the groove and will therefore prevent danger of breakage.

In detail, A is the ring of a width corresponding to that of the ring groove B in the piston C. The body portion of the ring is restricted in radial depth so as to render the same quite flexible but at the upper edge or side towards the combustion chamber there is the inwardly extending lip or flange D of sufficient extent to insure engagement with the groove. E is a corrugated ribbon expander of a width less than the width of the ring A and such that when placed with one edge against the lip D the opposite edge will enter the groove. In other words, the combined width of the expander and the lip is slightly less than the width of the groove so as to form a working engagement with the same.

With the construction as thus far described, it is obvious that the ring and expander may be readily engaged with the groove in the piston and held in registration even where the thin edge of the ring does not initially enter the groove. Thus when the ring is contracted by the use of any suitable ring clamp there is not the slightest danger that it will catch on the edge of the groove as would be likely if not positively held in registration. However, to eliminate any possibility of such catching the inner edge of the thin portion of the ring is slightly chamfered as indicated at F, so that even should the expander fail to exactly register the ring, the chamfer will guide it into the groove.

Figure 1:
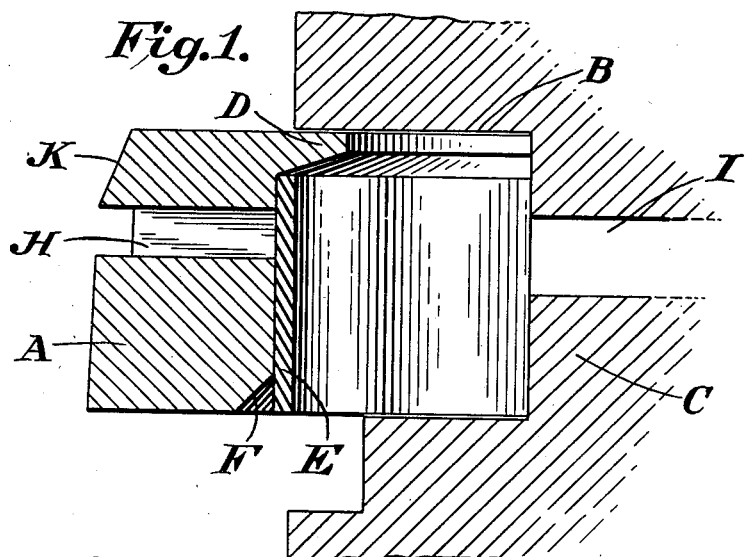
Figure 1 is an enlarged cross sectional view through the ring as it is being engaged with the ring groove of a piston.
Figure 2:
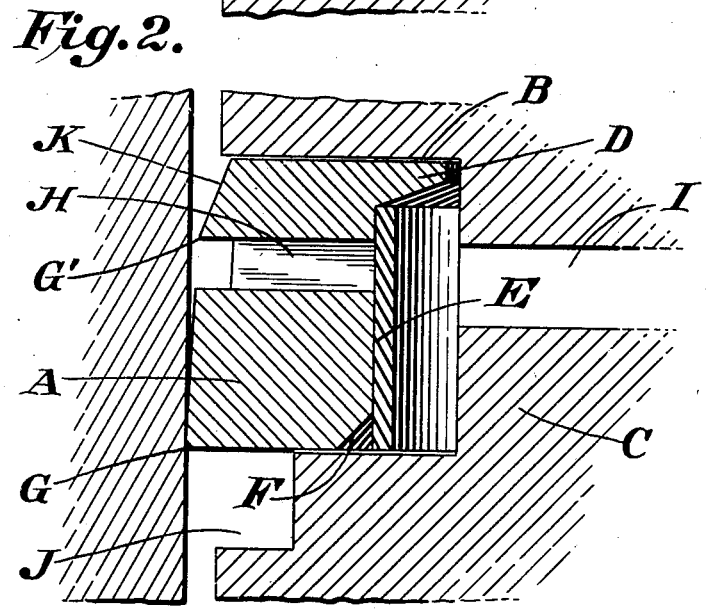
Figure 2 is a similar view showing the ring in full engagement with the groove and the piston and ring in engagement with the cylinder.
Figure 3:
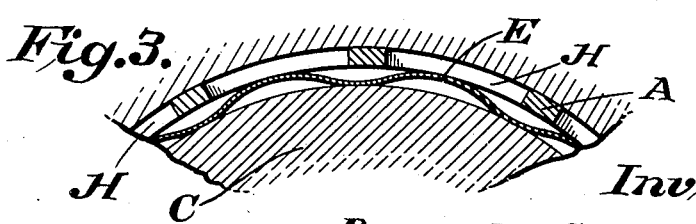
Figure 3 is a horizontal section through a portion of the piston, cylinder and ring.

When rings are first engaged with cylinders it is seldom possible to form a sealing bearing around the entire circumference as there are generally slight irregularities either in the cylinder or in the ring which form non-contacting areas. However, after the ring has been in service for a certain length of time it will become conformed to the cylinder wall so as to form an effective seal. To expedite this result I form the outer peripheral surface of the ring non-parallel to the axis of the cylinder with its maximum diameter at its lower edge. This tapering of the surface is very slight, preferably not to exceed two and one-half or three degrees, but it is sufficient to restrict the initial contact of the ring with the cylinder to the lower edge portions only. Consequently the ring will rapidly wear on these contacting portions until full sealing contact is obtained around the entire circumference. Eventually the wear may extend further up the length of the taper to become parallel to the cylinder wall. Thus as shown in Figure 2 the periphery of the ring tapers inward from the lower edge G at an angle of approximately two and one-half degrees to a point G' and then at a greater angle to the top of the ring. In wearing in the ring will gradually extend its bearing surface upward for a portion of the distance between the points G and G' to become parallel to the cylinder wall, but the total area of contact will be less than the full width of the ring which will reduce the unit pressure required for maintaining the required pressure on the oil film.

As has been stated, the ring is preferably provided with a series of circumferentially extending slots H which permit flow of the oil between the cylinder wall and the ring groove. The oil thus admitted to the groove will flow over the top of the expander which is less in width than the ring groove and will find access to the drain apertures I. These slots H are located between the points G and G' and therefore any excess in thickness of oil film will be squeezed or blown into the slots and will prevent pumping of the oil into the explosion chamber.

It is quite common practice in the manufacture of pistons to decrease the diameter adjacent to the lower ring groove so as to leave greater clearance between the same and the cylinder wall as indicated at J, Figure 2. As this decreases the width of the land against which the lower edge of the ring contacts, it is desirable to place the lip D at the top of the ring as has been described. Also where the peripheral face is tapered the outwardly projecting edge should be located at the bottom of the ring. To insure the installation of the rings right side up I preferably form a chamfer or bevel K at the top of the peripheral face, this being of a much steeper angle than the taper between the points G and G' so that it can be readily observed by the workman. This beveled edge has the further advantage of reducing the width of the peripheral portion of the ring which eventually bears against the oil film and thus increases the unit pressure upon said film.

The ring as thus far described is intended for use as an oil ring. It is, however, equally adapted for use as a compression ring, but where so used the peripheral surface is not initially tapered but is parallel to the axis of the ring and the cylinder.

In use, after the ring has worn to form a complete line of bearing around the circumference of the cylinder, the lower portion of the periphery will thin the oil film to the desired minimum. However, as some leakage of the oil past the oil ring is inevitable, this will tend to work upward past the successive rings until it enters the combustion chamber. Such a result is prevented by the slots H together with the increased clearance between the upper portion of the tapered peripheral surface and the cylinder wall, and also by the gas pressure leakage past the upper rings. Thus any accumulation of oil on the cylinder wall above the point G on the ring will be blown out by gas leakage through the slots H to the drain port I.

In using the terms upper and lower sides as applied to the ring and ring groove I mean the sides respectively towards or away from the combustion chamber even should the engine be reversed in position.

What I claim as my invention is:

1. The combination with a cylinder and a piston having a ring groove therein, of a ring in said groove provided with a series of circumferential slots extending therethrough between the upper and lower edges thereof for the passage of oil, the body portion of said ring being reduced in radial thickness to increase the flexibility thereof, leaving a radially inwardly extending lip or flange adjacent to its upper edge only, and the peripheral portion of said ring being slightly tapered radially inward from the lower edge portion upward, and an expander of lesser width than the ring engaging the same to press the projecting edge of the tapered periphery against the cylinder.

2. The combination with a cylinder and a piston having a ring groove therein, of a ring in said groove having its peripheral face tapered radially inward from its lower edge upward, said ring having its lower portion reduced in radial thickness to increase the flexibility thereof, leaving a radially inwardly extending lip or flange adjacent to its upper edge with oil apertures through the ring between its upper and lower edge and a corrugated ribbon expander of lesser width than the ring arranged beneath said inwardly projecting lip or flange and exerting radially outward pressure through the projecting edge of the tapered periphery against the oil film.

3. The combination with a piston having a ring groove therein, with a relieved portion beneath said groove reducing the width of the land for the ring, a ring having a series of circumferentially extending slots between its upper and lower faces, said ring being reduced in radial depth to increase the flexibility thereof and leave a radially inwardly extending lip or flange adjacent to the upper edge only, a corrugated ribbon expander of lesser width than the groove and engaging the same and bearing on said ring beneath said lip or flange one edge of the outer crest engaging said lip or flange, thereby holding said ring in registration with said groove for entrance therein, the inner lower edge of said ring being chamfered to facilitate entrance into said groove.

4. The combination with a piston having a ring groove therein and an adjacent peripheral portion reduced in diameter to form an oil channel partly cutting away one side wall of said groove, of a ring in said groove having its body portion reduced in radial thickness to increase flexibility and having an inwardly extending lip or flange adjacent to the wall of said groove opposite to the one partly cut away, and a corrugated ribbon expander having one edge of its outer crest engaging said lip or flange and the opposite edge of the inner crest engaging said cut-away wall of the groove to hold said ring in substantial registration with the groove.

5. The combination with a piston having a ring groove therein and an adjacent peripheral portion reduced in diameter to form an oil channel partly cutting away one side wall of said groove, of a ring in said groove having its body portion reduced in radial thickness to increase flexibility and leaving an inwardly extending lip or flange adjacent to the wall of said groove opposite to the one partly cut-away, the opposite edge of said body portion being chamfered and a corrugated ribbon expander having one edge of its outer crest engaging said lip or flange, and the opposite edge of the inner crest engaging said cut-away wall of the groove to hold said ring in substantial registration with the groove, said chamfered edge facilitating entrance of the ring into the groove.

In testimony whereof I affix my signature.

DEAN M. SOLENBERGER.